UNITED STATES PATENT OFFICE.

JAMES OTIS HANDY, OF PITTSBURG, PENNSYLVANIA.

PROCESS OF TREATING ORES.

No. 821,637.

Specification of Letters Patent.

Patented May 29, 1906.

Application filed February 24, 1906. Serial No. 302,734.

*To all whom it may concern:*

Be it known that I, JAMES OTIS HANDY, a citizen of the United States, residing in Pittsburg, county of Allegheny, and State of Pennsylvania, have invented certain new and useful Improvements in Processes of Treating Ores; and I do hereby declare the following to be a full, clear, and exact description of the invention, such as will enable others skilled in the art to which it appertains to make and use the same.

This invention relates to processes of treating ores; and it consists in a method of treating certain arseniferous ores for the extraction of cobalt and nickel and other valuable constituents, all as more fully hereinafter set forth, matters of novelty being particularly set forth in the appended claims.

There are certain arsenical ores of the general nature of those now mined in the cobalt camp of the Nipissing (Ontario) mining district which have hitherto resisted efforts to extract all the contained values by cheap and effectual methods. The ores from cobalt, for example, consist mainly of arsenids, arsenates, arsenites, antimonids, &c., of cobalt, nickel, iron, &c., in a calcite gangue and carry considerable silver, either in the native state or in combination. Heretofore no satisfactory method has been evolved for recovering all these values, even by the buyers who have purchased large quantities of these ores, believing they could be worked. Recovery of the silver in the lead-smelter is of course practicable; but this sacrifices nearly all the cobalt, nickel, arsenic, &c. In smelting such ores some low-grade speiss may be formed; but most of the cobalt, &c., is lost. Even roasting of these ores has not proved practicable, for the reason that silver goes over with the fumes of arsenic, &c., and the losses from this cause in some experiments have amounted to as much as twenty-five per cent. Further, in none of these prior methods have the cobalt and nickel been produced in easily-available forms separated from the other constituents of the ore. Neither have the cobalt and nickel been separated from each other.

It is the object of the present invention to treat such ores by a simple, ready, and cheap method for the recovery of practically all the valuable constituents of the ore in easily-available form, doing this by an organized succession of steps, each resulting in the formation of a valuable product, and the several steps of the method as a whole coöperating to deliver the nickel and cobalt in commercial forms. For this purpose I preliminarily crush and powder the ore to about eighty-mesh size. Much of the contained gold, silver, &c., will refuse to pass through sieves of this mesh, a residue of "metallics" being often obtained which runs as high as fifty to eighty per cent. of silver. This residue may be treated in any of the usual ways, as by smelting, or sold direct, or the silver and gold may be dissolved by appropriate solvent, and precipitated by metallic iron or other reagent and added to the silver and gold obtained in later operations.

In the sifted ore it is often advisable to concentrate the valuable minerals to economize reagents later on. This may in some cases be done by elutriation or other mechanical treatment; but in others, as with the ores from cobalt, the calcite is often too intimately admixed to permit such mechanical separation. Some of these ores, even when high grade, contain as much as twenty to thirty per cent. calcite. In such instances it may be removed by solution with acid or in other well-understood ways. Very hot dilute sulfuric acid is suitable, or the valuable minerals, which are much like speiss in their nature, may be concentrated by a preliminary furnacing of the lump ore with or without fluxes like silica or limestone; to form a speiss before further treatments. A manner of forming such a speiss is later described. For the purposes of my method such speisses may be treated exactly like the ore, concentrated or unconcentrated.

The ore, freed from metallics and concentrated in any of the ways described, if this be considered advisable, is next decomposed by an acid medium. For this purpose concentrated sulfuric acid is suitable. Ores of the class described may be completely decomposed and oxidized by heating with concentrated sulfuric acid to 400° Fahrenheit for several hours. The bases present are converted into sulfates and the arsenic oxidized to arsenious oxid, which partly volatilizes and partly goes into solution to be separated afterward. The volatilized portion may be condensed in the usual "poison-chambers" and recovered.

The amount of arsenic driven off and recovered in this operation will depend very largely upon the heat employed, and as what is here not separated must subsequently be removed it is advisable to use high temperatures. This also shortens the time necessary. For this purpose the sulfuric acid may have added to it an alkaline sulfate in greater or less amount, thereby forming acid sulfates capable of withstanding comparatively high temperatures, or, and very advantageously, acid sulfates may be used direct. I prefer the sodium salt, since potassium bisulfate and the normal sulfate formed from it on heating are relatively less soluble, embarrassing the leaching operations further on. The potassium salt has the additional disadvantage of forming difficultly-soluble double salts with nickel and cobalt sulfates and of forming alums, also difficultly soluble. For these reasons I prefer the sodium bisulfate to the corresponding potassium salt; but the latter may be used in some cases. Sodium bisulfate may very advantageously contain about forty per cent. of available sulfuric acid. Niter cake is a cheap and convenient commercial form of bisulfate.

When the sodium sulfate is used, either as bisulfate or as an addition to sulfuric acid, it may be recovered in the later steps of the process, and the process thereby cheapened materially.

Using the bisulfate of sodium the powdered ore is thoroughly mixed with the powdered flux. Ordinarily I prefer to use about three parts of the bisulfate to one of ore. The mixture is next fused, preferably, in two stages. The necessary heat may be applied in any convenient way and in any convenient apparatus, either through a containing vessel or by reflected or radiated heat, as in a reverberatory. During the first stage some frothing takes place, this being less if the heat be supplied from above or from the sides, and also less if the mixture is dry and not too high in calcite gangue.

The heat applied in the first stage should be enough to insure fusion and the expulsion of carbon dioxid, water, and some or most of the excess of sulfuric acid. In the second stage a heat approaching a dull red is used, and the mass usually becomes colored from the formation of colored sulfates, frequently becoming pink from the presence of cobalt sulfate. In this stage of heating sulfur dioxid and arsenious oxid vapors are evolved. The arsenious acid is led off to any suitable condensing apparatus, such as the usual poison-chambers, and there condensed, forming a valuable by-product. The underlying idea in this treatment, either with the sulfuric acid or with the bisulfate, is to oxidize in the presence of an acid medium capable of combining with the bases. Part of the sulfur trioxid of the acid or bisulfate is reduced by the unoxidized bodies present in the ore, sulfur dioxid escaping and the rest of the sulfur trioxid combines with the basic oxids to form sulfates. Using the bisulfate these sulfates are fluxed and dissolved by the sodium sulfate. The arsenious oxid is the only one of the oxids formed which has no affinity for acids, and as it is volatile it is driven off, as described. The silver is largely converted into sulfate and does not tend to escape with the arsenic, as in the ordinary roasting processes, hereinbefore referred to.

Naturally any mixture of salts or other reagents which will exercise at once the functions of an oxidant and of an acid-fluxing agent may be employed. For instance, borax, silicates, silica, or other bodies capable of acting as acids at high temperatures may be admixed with a nitrate, such as the nitrate of potassium or sodium, and the ore, or a mixture of acid flux and ore may have the oxidant added portionwise. The point is to oxidize and retain the bases by an acid body capable of withstanding relatively high temperatures, while at the same time oxidizing and expelling the arsenic.

Using the stated acid fluxes, by very careful treatment the oxidant may be replaced by air, the various basic oxids formed combining with the acid flux while the arsenic is expelled. Without such careful treatment a speiss of arsenic and other metals is very likely to be formed. This I may make designedly as useful as an accessory reagent in the main process for purposes later appearing. The lump or powdered ore may be fused with soda ash and silica, some of the soda being replaceable by lime when the ore happens to be poor in that substance. For example, two parts of ore may be fused with one part of soda ash and one part of silica, giving a clean slag and a speiss containing arsenic combined with silver, cobalt, and nickel; but, as stated, for breaking up the ore the sodium bisulfate is cheap, convenient, and readily recoverable, and it is further advantageous as obviating the necessity of an acid to bring the melt into solution when the hereinafter-described method is to be applied for regaining the other bodies from the same. For such an application when borax, silicates, and similar acid fluxes have been employed ordinarily an acid such as hydrochloric or sulfuric must be used to bring the melt into solution.

Using sulfuric acid or the bisulfate in the manner described, all the basic oxids are converted into stable sulfates, and though some or all of the iron may be further converted into ferric sulfate and broken up into oxid by raising the temperature I ordinarily prefer to leave some or all of it as ferrous sulfate for reasons later appearing.

When the melt is thoroughly sulfated in either of the ways described, it is allowed to cool and extracted with water.

When the bisulfate has been used, it is advantageous to use a small portion of hot water for the extraction, since when the solution is allowed to cool much of the sodium sulfate formed in the fusion will be found to crystallize out, being thereby regained for use, and the solution will be purer for subsequent manipulation.

Under the influence of the hot water the soluble sulfates—such as those of silver, cobalt, nickel, manganese, iron, sodium, &c.—are dissolved, leaving a residue of insoluble sulfate of calcium, silica, silicates, &c. If lead, barium, and strontium be present, their sulfates will also be found in this residue. Silver sulfate, however, while going into solution is again quickly reduced by the reducing bodies present—such as ferrous sulfate, sulfites, and arsenious oxid—and the silver formed goes into the residue. If an insufficient amount of these reducing bodies is found in the melt and silver remains in solution, it can be removed in a number of ways. Metallic iron will reduce it and may be used. More ferrous sulfate may be added to supplement that already in the melt. Another convenient method is to add a little of the original ore. The contained smaltite and other cobalt minerals will readily precipitate silver from the solution, a corresponding amount of cobalt, &c., being dissolved. By this procedure it is obvious a portion of the ore may be directly treated without the necessity of sulfating. The reaction between silver sulfate and finely-ground arsenid of cobalt, &c., is very rapid, even below the boiling-point of the sulfate solution. The speiss before mentioned, which represents a concentrated arsenid, may also be used for this precipitation.

The precipitation of the dissolved silver by any of the methods stated may be performed either before or after the leaching-water is removed from the residue of insoluble sulfates. In the former case the precipitated silver mingles in the precipitate with the insoluble sulfates.

As the sulfates, &c., in the undissolved residue are much lighter than silver, this residue after separating from the solution of the soluble sulfates may be concentrated as regards the silver by elutriation or stirring up with water, or the silver may be directly recovered from the residue.

The silver-freed lixiviate from the melt contains sulfates of sodium, lime, magnesium, iron, cobalt, nickel, manganese, &c., as well as some residual arsenic or arsenious acid. Where treatment of the ore has been with sulfuric acid, the amount of this arsenious oxid may be comparatively large. In the case of the bisulfate treatment there will be less, the amount depending on the manner in which the fluxing operation has been performed; but ordinarily there will not be enough to be of any commercial significance. At the same time it is necessary to remove it before proceeding to further operations. To remove this residual dissolved arsenic, the liquid is neutralized, preferably with a little milk of lime, being left a little on the acid side. Iron, arsenious acid, sulfites, &c., are then oxidized by the careful addition of any oxidant. Bleaching-powder (hypochlorite of lime) or other hypochlorite is convenient. Neutralization with lime is resumed till a dark-brown precipitate begins to form, when whiting or any other commercial form of carbonate of lime is added. The admixture is well stirred and the precipitation completed by the cautious addition of a little lime water to combine with free carbon dioxid. By this operation the iron is completely precipitated, carrying down with it the residual arsenic left after the fluxing, while the sulfates of cobalt and nickel are unaffected. The precipitate is separated by filtration or decantation, and the clear liquid is ready for further treatment. For this purpose the liquid is treated by the cautious addition of a solution of hypochlorite, preferably the sodium salt, though the calcium salt may be used, for the precipitation and separation of the nickel and cobalt. The hypochlorite is added as long as potassium ferricyanid—which gives a reddish coloration with cobalt—indicates the presence of cobalt in the solution. The cobalt is precipitated as cobaltic oxid, while the nickel remains dissolved. After separation of the cobalt precipitate by filtration or decanting the residual nickel may be precipitated in its turn by the addition of more hypochlorite. Since this hypochlorite precipitation is preferential, all the cobalt coming down before any of the nickel, the operator may at pleasure obtain a pure cobalt precipitate, free from nickel, by using the exact amount of hypochlorite required, or, and more easily, by letting a little cobalt remain in the solution—i. e., by using a little less of the reagent than is necessary for the full amount of the cobalt, or he may obtain a cobalt-free-nickel solution by throwing down a little nickel with the cobalt. In practice I prefer this latter alternative, since the coprecipitated nickel oxid can be readily removed from the precipitate by treatment with a little hot solution of cobalt sulfate. The nickel dissolves and is replaced by an equivalent amount of cobalt. For this purpose a portion of the solution freed of iron and arsenic in the manner described may be used. After treatment of the precipitate with the cobalt-sulfate solution, this latter, now containing the nickel which was in the precipitate, may be added to another portion of the solution which is to undergo the hypochlorite treatment.

From the cobalt-free-nickel solution the nickel may be precipitated by hypochlorite, or it may be thrown down by the addition of a base, such as an alkali or alkaline earth, or by precipitation with an oxidizing agent, or by the addition of both base and oxidizing agent. Bromin may be used as oxidizing agent. Chlorin is also suitable.

In lieu of directly precipitating cobalt and nickel from the solution freed from arsenic and iron in the manner described these bases may be preliminarily removed as sulfids. For this purpose said solution freed from arsenic and iron is treated with enough of any suitable acetate—such as the potassium, sodium, calcium, magnesium, or ammonium salt—to convert all cobalt and nickel into acetates, and then precipitated by hydrogen sulfid, after warming. Cobalt and nickel will come down as sulfids in a comparatively pure state, and these sulfids, after removing from the solution, may be roasted to convert them into sulfates, or otherwise brought into solution, and then precipitated by hypochlorite in the manner described. In lieu of hydrogen sulfid the sulfid of potassium or sodium may be used; but a little acid should be present in such event to prevent the coprecipitation of impurities. The white or mono sulfid is best.

Where the sulfid precipitation is not resorted to, but the solution from the iron-arsenic separation is directly precipitated with hypochlorite, the cobalt is usually contaminated with some manganese. This, however, is removed in the treatment with cobalt-sulfate solution. Manganese also appears in the later nickel precipitate, but can be similarly removed by treatment with nickel sulfate.

After removal of the nickel and cobalt, either by sulfid or hypochlorite treatment, the residual solution may be evaporated to recover the sodium sulfate therein contained. After evaporation the sodium sulfate crystallizes out in the form of the hydrated salt, the so-called "Glauber's" salt. It is preferable to expose the crystals to air until nearly dehydrated rather than to directly dry them, since they have a tendency to fuse in their water of crystallization and bake in the bottom of containing vessels when dried by artificial heat. After partial dehydration in the air, however, they may be safely finished by artificial heat. The dry or nearly dry salt may be added to the sulfuric acid in the manner described, or it may be converted into bisulfate by adding the proper amount of sulfuric acid and heating. This recovery of sodium sulfate effects a marked economy in the process.

In using ferrous sulfate to precipitate dissolved silver it is advantageous to add it during the last part of the extraction with water to prevent useless oxidation by air. Ferrous sulfate for this purpose has the advantage over metallic iron that it does not tend to precipitate arsenic with the silver.

It is advantageous to use boiling water in extracting the sulfated ore, since silver reduction goes on better at this temperature and, as stated, less water need be used with advantage in the recovery of sodium sulfate at this point.

By the described process of treating ores of the class described it will be observed that I recover all the valuable constituents in marketable form. The silver appears partly in the metallics and partly in the reduced metal after sulfating. Where the ore contains gold, as is the case in certain ores of this type from Oregon, it is recovered with the silver in the residue after sulfating. The arsenic is recovered in the fusion with fluxes. The cobalt and nickel are separated from the other and less valuable bases and from each other in the form of oxids directly merchantable. The process as a whole comprises a direct series of steps tending toward the recovery of cobalt and nickel.

To recapitulate, my process in the preferred form consists in pulverizing an ore of the class described to about eighty-mesh fineness, sifting out the metallics for separate treatment, sulfating or otherwise oxidizing and acidifying to expel and recover arsenic, dissolving and reducing and separating silver and gold, precipitating iron and residual arsenic together, and then fractionally separating and recovering cobalt and nickel by preferential precipitation. I prefer as a fractionating agent a hypochlorite rather than the other reagents described, since it gives a cobaltic oxid easy to wash and handle; but chlorin or bromin in the presence of an alkaline carbonate or the carbonate of an alkaline earth, such as chalk, may also be used.

In sulfating either with sulfuric acid or the bisulfate, some economy of reagent may be attained by using a little less than is necessary to decompose the cobalt minerals. The undecomposed residue will be broken up by the silver sulfate in leaching.

What I claim is—

1. In the treatment of arseniferous cobalt and nickel ores containing silver, the process which consists in powdering and sifting the ore to separate metallics, sulfating the fine ore, reducing and recovering the silver, removing iron and arsenic together, and separating and recovering cobalt and nickel.

2. In the treatment of arseniferous cobalt and nickel ores containing silver, the process which consists in sulfating the ore, reducing and recovering the silver, removing iron and arsenic together, and separating and recovering cobalt and nickel.

3. In the treatment of arseniferous cobalt and nickel ores containing silver, the process which consists in sulfating the ore, reducing and recovering the silver with a fresh portion of the ore, removing iron and arsenic together, and separating and recovering cobalt and nickel.

4. In the treatment of arseniferous cobalt ores, the process of reducing silver and dissolving cobalt which consists in treating a solution of sulfate of silver with an arsenid ore of cobalt.

5. In the treatment of arseniferous cobalt and nickel ores containing silver, the process which consists in oxidizing the ore in the presence of a molten acid flux to expel and recover arsenic, bringing the soluble matters of the melt into solution and reducing and recovering the silver, removing iron and residual arsenic together from the solution, and precipitating cobalt and nickel.

6. In the treatment of arseniferous cobalt and nickel ores containing silver, the process which consists in oxidizing the ore in the presence of a molten acid flux to expel and recover arsenic, bringing the soluble matters of the melt into solution and reducing and recovering the silver, removing iron and residual arsenic together from the solution, and separating cobalt and nickel by fractional precipitation.

7. In the treatment of arseniferous cobalt and nickel ores containing silver, the process which consists in oxidizing the ore in the presence of a molten acid flux to expel and recover arsenic, bringing the soluble matters of the melt into solution and reducing and recovering the silver, removing iron and residual arsenic together from the solution, and separating cobalt and nickel by fractional precipitation with hypochlorite.

8. In the treatment of arseniferous cobalt and nickel ores containing silver, the process which consists in fusing the ore with sodium bisulfate to expel and recover arsenic, bringing the soluble matters of the melt into solution and reducing and recovering the silver, removing iron and residual arsenic together from the solution, and precipitating cobalt and nickel therefrom.

9. In the treatment of arseniferous cobalt and nickel ores containing silver, the process which consists in fusing the ore with sodium bisulfate to expel and recover arsenic, bringing the soluble matters of the melt into solution and reducing and recovering the silver, removing iron and residual arsenic together from the solution, and separating cobalt and nickel by fractional precipitation.

10. In the treatment of arseniferous cobalt and nickel ores containing silver, the process which consists in fusing the ore with sodium bisulfate to expel and recover arsenic, bringing the soluble matters of the melt into solution and reducing and recovering the silver, and separating cobalt and nickel by fractional precipitation with hypochlorite.

11. In the treatment of arseniferous cobalt ores, the process which consists in fusing the ore with sodium bisulfate to expel and recover arsenic.

12. In the treatment of arseniferous ores containing silver, the process which consists in fusing the ore with sodium bisulfate to expel and recover arsenic, bringing the soluble matters of the melt into solution, and reducing and recovering the silver.

13. In the treatment of arseniferous cobalt and nickel ores containing silver, the process which consists in fusing the ore with sodium bisulfate to expel and recover arsenic, bringing the soluble matters of the melt into solution, and precipitating dissolved silver by a fresh portion of ore.

14. In the treatment of arseniferous cobalt and nickel ores containing silver, the process which consists in fusing the same with an acid flux to expel and recover arsenic, bringing the soluble matters of the melt into solution and reducing and recovering the silver.

15. In the treatment of arseniferous cobalt and nickel ores containing silver, the process which consists in fusing the ore with sodium bisulfate to expel and recover arsenic, bringing the soluble matters of the melt into solution and reducing and recovering the silver, removing iron and residual arsenic together from the solution, precipitating cobalt and nickel therefrom and evaporating and crystallizing to recover sodium sulfate for reuse.

16. The process of extracting cobalt from arseniferous cobalt and nickel ores containing silver which consists in oxidizing the same in the presence of a molten acid flux, leaching the melt and reducing the same to precipitate silver, removing iron and residual arsenic together from the solution, precipitating cobalt together with a little nickel by the addition of slightly more of an oxidizing agent than corresponds to the cobalt present, and treating the precipitate with a fresh portion of a cobalt solution to dissolve out the nickel therefrom.

17. The process of extracting cobalt from arseniferous cobalt and nickel ores containing silver which consists in fusing the same with sodium bisulfate, leaching the melt and reducing the same to precipitate silver, removing iron and residual arsenic together, precipitating cobalt by the addition of slightly more hypochlorite solution than corresponds to the cobalt present, and treating the precipitate with a fresh portion of the iron and arsenic-free solution to dissolve out the nickel.

18. In the treatment of arseniferous cobalt and nickel ores containing silver, the process which consists in grinding and sifting the same to eighty-mesh fineness to separate metallics, fusing the sifted ore with sodium bisulfate to expel and recover arsenic, dissolving the melt and reducing dissolved silver with a fresh portion of ore, removing iron and residual arsenic together from the solution, removing cobalt and nickel by fractional precipitation with hypochlorite, and recovering sodium sulfate for reuse.

In testimony whereof I affix my signature in the presence of two witnesses.

JAMES OTIS HANDY.

Witnesses:
FOSTER HEWETT,
GEO. H. CEATT.

---

It is hereby certified that in Letters Patent No. 821,637, granted May 29, 1906, upon the application of James Otis Handy, of Pittsburg, Pennsylvania, for an improvement in "Processes of Treating Ores," errors appear requiring correction, as follows: Lines 20 and 24, page 1, the words "cobalt" should read *Cobalt*, and the name of the second witness to the printed specification, for "Geo. H. Ceatt," read *Geo. H. Clapp;* and that the said Letters Patent should be read with these corrections therein that the same may conform to the record of the case in the Patent Office.

Signed and sealed this 26th day of June, A. D., 1906.

[SEAL.]

E. B. MOORE,
*Acting Commissioner of Patents.* and nickel ores containing silver, the process which consists in grinding and sifting the same to eighty-mesh fineness to separate metallics, fusing the sifted ore with sodium bisulfate to expel and recover arsenic, dissolving the melt and reducing dissolved silver with a fresh portion of ore, removing iron and residual arsenic together from the solution, removing cobalt and nickel by fractional precipitation with hypochlorite, and recovering sodium sulfate for reuse.

In testimony whereof I affix my signature in the presence of two witnesses.

JAMES OTIS HANDY.

Witnesses:
FOSTER HEWETT,
GEO. H. CEATT.

---

It is hereby certified that in Letters Patent No. 821,637, granted May 29, 1906, upon the application of James Otis Handy, of Pittsburg, Pennsylvania, for an improvement in "Processes of Treating Ores," errors appear requiring correction, as follows: Lines 20 and 24, page 1, the words "cobalt" should read *Cobalt*, and the name of the second witness to the printed specification, for "Geo. H. Ceatt," read *Geo. H. Clapp;* and that the said Letters Patent should be read with these corrections therein that the same may conform to the record of the case in the Patent Office.

Signed and sealed this 26th day of June, A. D., 1906.

[SEAL.]

E. B. MOORE,
*Acting Commissioner of Patents.*

It is hereby certified that in Letters Patent No. 821,637, granted May 29, 1906, upon the application of James Otis Handy, of Pittsburg, Pennsylvania, for an improvement in "Processes of Treating Ores," errors appear requiring correction, as follows: Lines 20 and 24, page 1, the words "cobalt" should read *Cobalt*, and the name of the second witness to the printed specification, for "Geo. H. Ceatt," read *Geo. H. Clapp*; and that the said Letters Patent should be read with these corrections therein that the same may conform to the record of the case in the Patent Office.

Signed and sealed this 26th day of June, A. D., 1906.

[SEAL.]

E. B. MOORE,
*Acting Commissioner of Patents.*